(12) United States Patent
Cullen

(10) Patent No.: US 7,237,576 B1
(45) Date of Patent: Jul. 3, 2007

(54) BAGGING MACHINES AND METHODS FOR ADJUSTABLY CONTROLLING PACKING DENSITY

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 0 days.

(21) Appl. No.: 11/378,194

(22) Filed: Mar. 17, 2006

(51) Int. Cl.
*B65B 1/04* (2006.01)

(52) U.S. Cl. .................. 141/71; 141/114; 141/313; 53/527

(58) Field of Classification Search .............. 141/71, 141/114, 313–319; 53/527, 567, 576; 100/2 V
See application file for complete search history.

(56) References Cited

U.S. PATENT DOCUMENTS

| | | | |
|---|---|---|---|
| 4,567,820 A | 2/1986 | Munsell | |
| 5,140,802 A | 8/1992 | Inman et al. | |
| 5,297,377 A | 3/1994 | Cullen | |
| 5,425,220 A | 6/1995 | Cullen | |
| 5,463,849 A | 11/1995 | Cullen | |
| 5,464,049 A | 11/1995 | Cullen | |
| 5,517,806 A | 5/1996 | Cullen | |
| 5,671,594 A | 9/1997 | Cullen | |
| 5,775,069 A | 7/1998 | Cullen | |
| 5,857,313 A | 1/1999 | Cullen | |
| 5,899,247 A | 5/1999 | Cullen | |
| 6,202,389 B1 | 3/2001 | Inman et al. | |
| 6,430,897 B1 | 8/2002 | Cameron et al. | |
| 6,443,194 B1* | 9/2002 | Cullen | 141/313 |
| 6,655,116 B2* | 12/2003 | Cullen | 53/527 |
| 6,694,711 B1 | 2/2004 | Cullen | |
| 6,941,731 B1 | 9/2005 | Cullen | |

* cited by examiner

*Primary Examiner*—Steven O. Douglas
(74) *Attorney, Agent, or Firm*—Douglas W. McArthur; Snell & Wilmer L.L.P.

(57) ABSTRACT

Bagging machines for bagging agricultural, compost, or other materials into an elongate bag for storage and/or composting are disclosed. The bagging machines include a mobile frame, a hopper, a rotary packing apparatus, and a material forming enclosure. The bagging machine is adapted to move forward as the loose material is packed into the bag against the closed end thereof. The bagging machines also may include a packing density measurement system including an anchor assembly and a force measurement assembly. The anchor assembly is adapted to be operatively coupled to the bagging machine and to engage packed material within the material forming enclosure. The anchor assembly engaging the packed material is adapted to apply an anchoring force to the bagging machine against the forward movement thereof. The force measurement assembly is operatively coupled to the anchor assembly and adapted to measure the anchoring force applied to the bagging machine.

20 Claims, 4 Drawing Sheets

BAGGING MACHINES AND METHODS FOR ADJUSTABLY CONTROLLING PACKING DENSITY

FIELD

This disclosure relates to bagging machines for adjustably controlling the packing density of material, such as silage, compost, or the like, packed into an elongate bag or container and to methods for operating such bagging machines to adjustably control the packing density.

BACKGROUND

Agricultural feed bagging machines have been employed for several years to fill, pack, or bag silage or the like into elongate plastic bags. In these conventional bagging machines, silage or the like is supplied to the forward or intake end of the bagging machine and is fed to a rotor that conveys the silage into a tunnel on which the bag is positioned so that the bag is filled. As silage is loaded into the bag, the bagging machine moves away from the filled end of the bag due to the back pressure applied by the packed material against the machine. These machines included a pair of drums rotatably mounted on the bagging machine with a brake associated therewith for braking, or resisting, the rotation of the drum with a selected brake force. A cable or chain was wrapped around the drum and was released with rotation of the drum. A backstop structure was disposed at the closed end of the agricultural bag and was coupled to the bagging machine via the chains or cables to resist the movement of the bagging machine away from the filled end of the agricultural bag as silage was forced into the bag.

In more recent bagging machines, a variety of density control assemblies, which included one or more cables, have been positioned in the flow of the silage material being bagged. In order to vary the density of the material in the machine, more or fewer cables would be employed based on the material being packed. For example, corn silage flows easy and would require more cables. Similarly, alfalfa packs hard and would require fewer cables. In other bagging machines, a single cable forming a loop has been employed with adjustment mechanisms allowing a user to lengthen or shorten the loop behind the bagging machine. In still other bagging machines, one or more ends of the loop have been coupled to movable trolleys to allow a user to adjust the configuration of the cable loop, such as by widening or narrowing the cable loop, during the bagging operation to adjustably control the packing density.

More recently, additional variations on the density control theme have included inflatable anchors or otherwise adjustable anchors suspended from one or more cables. Other variations include drag members disposed under the bagged material. Additionally, In U.S. Pat. No. 6,443,194, the entire disclosure of which is incorporated herein by reference for all purposes, the inventor of the present disclosure described an adjustable density control means including a screw anchor.

Control of the packing density during the bagging operation is important because a single bag may include material having different properties that packs differently. For example, a single bag may be several hundred feet long and may be packed with agricultural material, such as alfalfa, from all parts of a farm or region. The alfalfa is brought to the bagging machine in a number of separate loads, some of which may be wetter than others or some of which may include alfalfa cut longer than the alfalfa in other loads. The wet alfalfa or long alfalfa will pack more densely in a given bagging machine configuration than will dry or short alfalfa. Accordingly, a user may prefer to adjust the configuration of the density control apparatus in accordance with the material properties of the material being packed. Unfortunately, the extent and impact of the differences between the materials is rarely known until the material is packed into the bag and the packing density difference only evidences itself as loose packing or a bagging machine that is stuck due to the unexpectedly dense packing.

Previous bagging machines with adjustable density control apparatus allowed the user to control the packing density during operation based on their visual perception of the exterior of the bag and their sense for how hard the machine was working to pack additional material into the bag. Moreover, in many of the previous configurations, once a need to adjust the density control apparatus configuration was identified, it often took several feet of packing distance before the desired change was completed. For example, if the forward end of a cable loop is narrowed, the rearward end will trend narrower as it moves forward but it will not be as narrow as the forward end for at least several inches, if not several feet, of bagging machine movement. Therefore, there are at least three areas where inaccuracy or delay can be introduced into the packing operation resulting in material packed at a density other than the desired packing density. For example, the operator may be slow or inaccurate in observing changes in the packing density, the operator may be slow or inaccurate in executing the necessary commands or steps necessary to effect the change in the density control apparatus configuration, and/or the density control apparatus may introduce inherent delays between initiation of the configuration change and completion of the configuration change. Depending on the circumstances, that inaccuracy or delay may lead to undesirable loose packing for several inches or feet of the bag length or may cause the machine to become stalled due to the resistance force being greater than the available forward driving force. The loosely packed material wastes available storage space and may decrease the storage quality. A stalled machine interrupts the bagging operation and wastes many resources trying to free the machine from the packed bag and restarting the bagging operation. A bagging machine that provides for greater control over the packing density is described herein.

SUMMARY

The present disclosure is directed towards an adjustable density control apparatus for use with a bagging machine for bagging agricultural, compost, or other loose materials for storage and/or composting. The bagging machine receives the loose material and moves it into a material forming enclosure. The loose materials are packed into an elongate bag adapted to be coupled to the bagging machine. The elongate bag includes an open end adjacent or around the material forming enclosure of the bagging machine and extends rearwardly to a closed end of the bag. The bagging machine is adapted to move forward as loose material is packed into the elongate bag.

The density control apparatus includes a screw anchor assembly adapted to be operatively coupled to the bagging machine. The screw anchor assembly coupled to the bagging machine extends rearwardly within the material forming enclosure and is adapted to engage material packed within the material forming enclosure. The screw anchor engaged in the packed material is adapted to apply an anchoring force to the bagging machine against the forward movement thereof. Other suitable assembly may be used to operatively engage the packed material to apply an anchoring force.

The density control apparatus further includes a weigh bar assembly operatively coupled to the screw anchor assembly and adapted to measure the anchoring force applied to the bagging machine by the screw anchor assembly. The weigh bar assembly may be one component of an internal density measurement system. Additionally or alternatively, the weigh bar assembly may be one component of an automated density control system adapted to maintain the packing density within a predetermined range of a target density. Additionally, the density control apparatus includes a variable speed motor operatively coupled to the screw anchor. The variable speed motor includes a rotor adapted to selectively rotate the screw anchor assembly to vary the anchoring force applied to the bagging machine.

DETAILED DESCRIPTION

Figure 1:
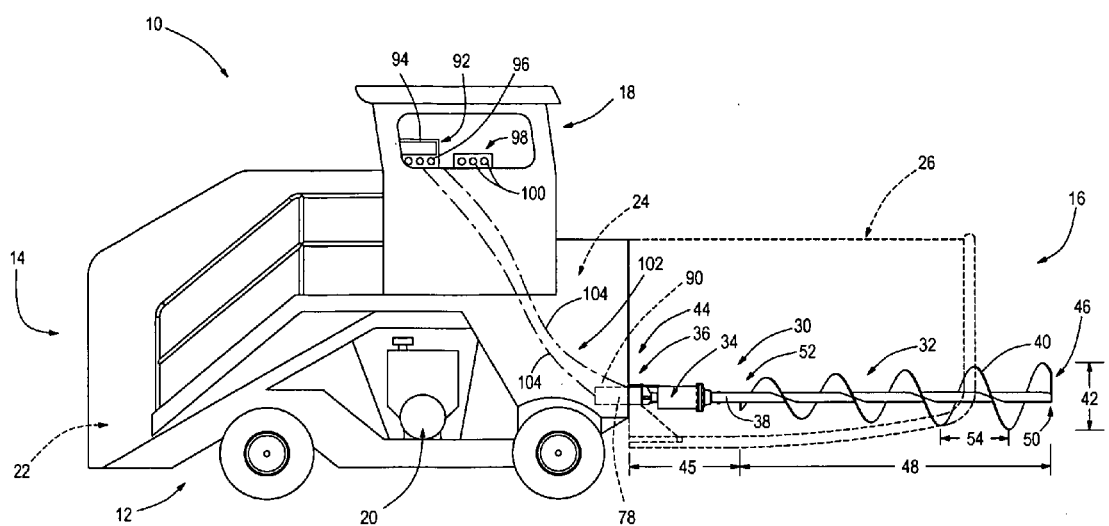
FIG. 1 is a side view of a bagging machine having a density control apparatus, including a screw anchor assembly, coupled to the bagging machine.

In FIG. 1, a bagging machine is identified generally with the numeral 10. Bagging machine 10 is adapted to bag organic and other material such as silage, grain, sawdust, compost, garbage, sand, etc. within a bag. Bagging machine 10 may be configured for use with a conventional pre-folded bag, a bag that is folded as it is installed on the bagging machine such as described in U.S. patent application Ser. No. 10/350,973, filed Jan. 23, 2003, or a bag that is formed from a roll of plastic material disposed on the bagging machine such as described in U.S. patent application Ser. No. 10/334,484 filed Dec. 30, 2002. The entire disclosures of the above-mentioned patent applications are incorporated herein by reference for all purposes.

Machine 10 is illustrated as including a mobile frame 12. Mobile frame 12 may include wheels to facilitate movement and control and may also include an operator's cab 18, an engine 20, and other associated component parts. In some configurations, one or more of the illustrated components may be omitted or replaced. For example, the engine and operator's cab may be omitted and the mobile frame may be provided with a hitch to be pulled by a tractor or other equipment. Additionally or alternatively, the wheels and/or hitch may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes. The mobile frame 12 of the bagging machine 10 may include a number of suitable component parts to facilitate the operation of the bagging machine under a variety of conditions.

For purposes of description, bagging machine 10 will be described as having a forward end 14 and a rearward end 16. Machine 10 is provided with a material-receiving assembly 22 at its forward end which may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; (5) a hopper such as seen in U.S. Pat. Nos. 5,140,802; 5,419,102; and 5,724,793; (6) a combination of one or more of the above; and/or (7) other suitable material receiving assemblies. The complete disclosures of the above-mentioned patents are incorporated herein by reference for all purposes. Material-receiving assembly 22 is configured to receive the loose material to be bagged and to deliver the same to a material-packing assembly 24, which may be positioned at the rearward end of the mobile frame 12. Material-packing assembly 24 may include: (1) a rotor such as shown and described in U.S. Pat. Nos. 5,396,753; 5,297,377; 5,799,472; or 5,295,554; (2) a screw conveyor such as shown and described in U.S. Pat. No. 5,140,802 or 5,419,102; (3) a plunger such as shown and described in U.S. Pat. No. 5,724,793; (4) the packing fingers shown and described in U.S. Pat. No. 3,687,061; (5) a combination of one or more of the above; and/or (6) other suitable packing assemblies. The complete disclosures of the above-mentioned patents are incorporated herein by reference for all purposes.

With continuing reference to FIG. 1, the bagging machine 10 may include a material-forming enclosure 26 coupled to the rearward end of the mobile frame 12. The material-forming enclosure 26 may also be referred to herein as a tunnel. The material-forming enclosure 26 may be semi-circular, as shown in FIG. 1, or it may be square, rectangular, circular, oblong, or other suitable configurations. The tunnel 26 may be open at the bottom, as shown in FIG. 1, or may be at least partially closed at the bottom. As used herein, the term "tunnel" should be understood to signify a horizontal passageway at least partially open at both the forward end thereof and the rearward end thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 10 is configured to be transported on a highway where machine width is a limiting factor. Various suitable tunnels and aspects of suitable tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; 5,894,713; and the other patents referenced above, the entire disclosures of which are incorporated herein by reference for all purposes. Material-forming enclosure 26 may be adapted to cooperate with a bag or other container (not shown) into which the material-packing apparatus 24 packs the material. Material-forming enclosure 26 may include a number of components to facilitate or otherwise aid the cooperation between the bag and material-forming enclosure 26. For example, material-forming enclosure 26 may include one or more bag retainers adapted to retain the bag on the material-forming enclosure and gradually release the bag as needed.

The bagging machine 10 may be adapted to pack a variety of materials. For example, packing machine 10 may be adapted to bag compost material or agricultural material into bags or containers for storage and/or composting. As material-packing apparatus 24 moves material into the bag, the bag fills and the material is pressed or compressed within the bag. The loose material becomes packed material in the material-forming enclosure 26. As additional material is packed into the bag, the back pressure from the packed material will move the bagging machine 10 forward. As the bagging machine 10 moves forward, additional bag material will be released as needed to provide additional room for the material. Accordingly, material-packing apparatus 24 may be adapted to move the bagging machine forward.

A density control apparatus 30 is operatively coupled to bagging machine 10, such as to mobile frame 12, and is disposed in operative association with the packed material 28 in the material-forming enclosure 26 to provide resistance to the forward movement of the bagging machine. The amount of resistance provided by density control apparatus 30 cooperates with material-packing apparatus 24 to control the rate at which bagging machine 10 moves away from the closed end of the bag.

With continued reference to FIG. 1, density control apparatus 30 includes a screw anchor assembly 32, a variable speed motor 34, and a weigh bar assembly 36. The screw anchor assembly 32 may be coupled to the bagging machine. The screw anchor assembly 32 may be selectively and releasably coupled to the bagging machine or it may be substantially fixedly coupled to the bagging machine. As used herein, "selectively" is used to indicate that a component is capable to at least two different configurations or states, such as coupled and uncoupled, which states may be selected by user interaction or by automatic control. As used herein, "releasably coupled" is used to indicate that two or more components may be separated or uncoupled without destroying, breaking, or otherwise damaging one or more of the components. Accordingly, "substantially fixedly coupled" is used to indicate that two or more components are coupled in a way that separating them would require breaking or otherwise damaging one or more of the components. As one example of a selectively and releasably coupled screw anchor assembly 32, the screw anchor assembly 32 may be selectively coupled to the motor 34, which may be selectively and releasably or substantially fixedly coupled to the bagging machine. Additionally or alternatively, the motor 34 and/or the weigh bar assembly 36 may be selectively and releasably or substantially fixedly coupled to the bagging machine 10. Selective and releasable coupling of the screw anchor assembly 32, the motor 34, the weigh bar assembly, and/or the subcomponents thereof, may facilitate maintenance of the density control apparatus 30. Additionally or alternatively, the selective and releasable coupling may facilitate the transportation of the bagging machine 10 and/or the density control apparatus 30.

When the density control apparatus 30 is coupled to a bagging machine 10, such as shown in FIG. 1, the screw anchor assembly 32 is adapted to extend rearwardly within the material-forming enclosure 26. The screw anchor assembly 32 is further adapted to engage the packed material 28 within the material-forming enclosure 26. When the screw anchor assembly 32 engages the packed material 28, the screw anchor assembly applies an anchoring force to the bagging machine 10 to slow the forward movement of the bagging machine. The nature of the engagement of the screw anchor assembly 32 in the packed material 28 and the systems and methods used to adjust and/or control the amount of anchoring force applied to the bagging machine 10 will become clear through the description provided herein.

In some embodiments of screw anchor assembly 32, and as illustrated in FIG. 1, screw anchor assembly 32 includes an elongate shaft 38 and at least one flight 40 operatively associated with the elongate shaft. The at least one flight 40 may be associated to provide a screw anchor assembly having an external diameter 42 ranging from about 1 foot to about 5 feet. The external screw diameter suitable for a particular bagging machine 10 or for a particular bagging operation may be selected based on one or more factors, such as the size of the material-forming enclosure, the type of loose material being packed, and the desired packing density of the packed material. An external screw diameter 42 between about 1 foot and about 3 feet may be suitable for silage and/or compost bagging operations in material-forming enclosures having diameters between about 6 feet and about 14 feet. While FIG. 1 illustrates a single-flight screw anchor assembly 32, a double-flight or other configurations of the one or more flights may be used. The configuration of the one or more flights, whether single-flight, double-flight, or otherwise, may also affect the preferred external diameter of the screw anchor assembly.

The one or more flights 40 of the screw anchor assembly 32 may extend along the elongate shaft 38 any suitable distance. As illustrated, the one or more flights 40 are set apart from the forward end 44 of the density control apparatus 30 by an off-set distance 45 and extend along the shaft 38 to the rearward end 46 of the density control apparatus 30. Depending on the bagging operation, the packed material 28 may not be sufficiently compacted in the region adjacent the forward end 44 of the density control apparatus 30 for the screw anchor assembly to effectively engage the packed material. Additionally or alternatively, the initiation of the one or more flights may be off-set from the forward end of the density control apparatus due to the presence of other components, such as the weigh bar assembly 36 and/or the variable speed motor 34. The length of the off-set distance 45 may depend on the configuration of the material-forming enclosure 26, the material being packed, the desired packing density, and the configuration of the one or more flights 40 and other aspects of the screw anchor assembly, among other factors. The off-set distance 45 may be customized based on any one or more of these factors. Additionally or alternatively, the density control apparatus 30 of the present disclosure may include a screw anchor assembly having a standardized off-set distance 45.

As illustrated in FIG. 1, the one or more flights 40 of screw anchor assembly 32 may be adapted to provide a tapered screw diameter 42. The one or more flights 40 may be adapted to provide a gradually changing diameter along the flight length 48, where the flight wraps around the elongate shaft 38. The screw anchor assembly 32 may have a decreasing screw diameter 42 from the rearward end 50 of the flight to the forward end 52 of the flight. Similarly, the screw diameter 42 of the screw anchor assembly 32 may be tapered in the reverse direction. Additionally or alternatively, the screw anchor assembly 32 may be configured to include an increasing diameter from the forward end 52 of the flight to a point along the flight length 48 and to provide a decreasing diameter from that point to the rearward end 50 of the flight. The rearward end 50 of the flight may be substantially at the rearward end 46 of the density control assembly 30 as illustrated in FIG. 1. Additionally or alternatively, the flight may have a rearward end 50 disposed forward of the rearward end 46 of the density control assembly. In screw anchor assemblies including more than one flight, one or more flights may have a flight length 50 different from the flight lengths of another flight. For example, a screw anchor assembly may be provided with a primary flight having a first screw diameter and a first flight length and may further be provided with a secondary flight have a second screw diameter and a second flight length.

Additionally or alternatively, the screw anchor assembly 32 may be provided with one or more flights adapted to provide a stepped or a tiered screw diameter. For example, rather than a gradual increase in the screw diameter from the forward end 52 of the flight to the rearward end 50 thereof, one or more of the flights may be configured to provide an abrupt change in the screw diameter 42. The stepped or tiered screw diameter 52 may change at the forward end 52 of the flight, may change at one or more points along the flight length, or both.

The one or more flights 40 of the screw anchor assembly 32 may be configured with a pitch 54, which may be constant along the flight length or which may vary along the flight length. The preferred pitch of a particular screw anchor assembly 32 may depend on a number of factors, such as the material to be bagged, the desired packing density, the screw diameter, the length of the elongate shaft, the flight length, the number of flights on the screw anchor assembly, the available rotational speeds of the variable speed motor, and other conditions of the bagging operation. A screw anchor assembly 32 having flights 40 configured with a pitch 54 between about 1 foot and about 4 feet may be suitable.

As discussed above, the various design considerations in the configuration of the screw anchor assembly can be varied according to a number of factors that may be specific to a particular bagging operation or that may be generalized to be suitable for a number of different bagging conditions. The screw anchor assembly 32, and specifically the flights 40, engages the packed material to provide the anchoring force that increases, and at least in part determines, the packing density in the bag. As the packing operation of the material-packing assembly 26 provides a forward driving force to the bagging machine, the engagement of the screw anchor assembly 32 in the packed material provides an anchoring force to the bagging machine. The relationship between the design and operation of the material-packing assembly and the screw anchor assembly may provide for a bagging machine capable of packing a bag to a number of different packing densities. For example, the material-packing assembly may operate at a preferred packing rate but be variable within a range of packing rates. Moreover, the packing rate of the material-packing assembly may depend on external factors, such as the feed rate of loose material to the material-receiving assembly 22. Additionally, the anchoring force provided by the screw anchor assembly 32 may vary depending on the configuration of the screw anchor assembly and on external factors such as the material being packed and the packing density at different points along the flight length. As any one or more of these variables change, the balance between the forward driving force and the anchoring force may be altered. If the driving force increases relative to the anchoring force, the packing density will decline. Similarly, if the anchoring force increases relative to the driving force, the packing density will increase. While some bagging operations are tolerant to minor variations in the packing density along the length of the bag, most operators prefer to maintain a consistent packing density. A consistent packing density may enable the operator to obtain the desired total storage volume as well as the desired aeration conditions within the bag.

The operator of the bagging machine 10 has little or no control over the conditions of the loose material being fed to the bagging machine, such as whether they are wet or dry. Furthermore, the operator has little or no control over the rate at which the material is fed to the material-receiving assembly, such as when there are delays in delivering the next load of loose material. Moreover, the material-packing assembly may have a limited packing force, or ability to pack material against resistance, such that material-packing assembly would be unable to move the machine forward if the anchoring force (due to an increased packing density) exceeds the maximum packing force of the material-packing assembly. Accordingly, an adjustable density control assembly may be desirable for a number of reasons. In some configurations, the anchoring force provided by the density control assembly of the present disclosure can be varied by rotating the screw anchor assembly.

During operation of the bagging machine when the packing density is determined to be at a desirable level, the operator may control the variable speed motor 34 to rotate the screw anchor assembly 32. Depending on the configuration of the at least one flight 40, rotation of the screw anchor assembly, either clockwise or counter-clockwise, may release the screw anchor assembly from the packed material or may further increase the engagement of the screw anchor assembly in the packed material. For example, when the desired packing density is reached, the screw anchor assembly 32 may be rotated clockwise to unscrew the screw anchor assembly from the packed material. Similarly, if the packing density is determined to be too low, the screw anchor assembly 32 may be rotated counter-clockwise to increase the anchoring force and thereby increase the packing density.

The configuration of the at least one flight 40, and particularly the length of the pitch 54, may be at least one factor in determining the desired rotational rate of the screw anchor assembly during the bagging operations. For example, for a given feed rate and packing density, a screw anchor assembly having a shorter pitch will have to rotate faster than a screw anchor assembly having a longer pitch. In one exemplary application of a screw anchor assembly 32 according to the present disclosure, the bagging machine may be adapted to pack material at a rate of 12 tons per minute into a 12 foot diameter material-forming enclosure. For at least some bagging operations, a desirable packing density may be 2 tons of material per linear foot of bag, or per linear foot of bagging machine forward movement. For a screw anchor assembly 32 having a 2 foot pitch, the variable speed motor 34 should rotate the screw anchor assembly at 3 revolutions per minute to keep up with the packing rate of the bagging machine (2 ft/rotation×2 tons/ft×3 rotations/minute=12 tons/minute=packing rate of exemplary bagging machine). Similarly, for a screw anchor assembly having a 3 foot pitch, the variable speed motor would rotate the screw anchor assembly at 2 revolutions per minute to keep up with the packing rate of the 12 tons per minute and a target packing density of 2 tons per foot. The desired rotation rate of the screw anchor assembly 32 is dependent at least upon the pitch 54 of the at least one flight 40, the packing rate of the bagging machine 10, and the characteristics of the material being packed, such as the density of the material being packed (as opposed to the packing density). Similar determinations of a desired rotation rate can be made for the various bagging conditions. The pitch 54 of the at least one flight 40 on the screw anchor assembly 32 may have a length ranging from about 1 foot to about 5 feet, with a pitch between about 2 feet and about 4 feet being preferred.

While theoretically it is possible to determine the desired bagging machine packing rate and the desired rotation rate for the screw anchor assembly and to instruct the operator to pack a bag under those conditions, the field conditions during a bagging operation are rarely static and seldom predictable. Moreover, due to the length and weight of these bags, it is not currently practicable to weigh the filled bag to determine the packing density during the bagging operations to allow for the necessary adjustments. Accordingly, operators are required to monitor to the exterior of the packed bags during the bagging operation, to determine, based on experience and intuition, whether the bag is being packed too tightly or too loosely, and to make necessary adjustments during the bagging operation. Mistakes and/or delays on the part of the operator can be costly to the bagging operation for a number of reasons, including wasted bag space, poorly packed material causing more or less aerobic activity than desired in the bag, and stalled bagging machines, among other possible consequences.

As discussed briefly above, a density control apparatus 30 according to the present disclosure includes a weigh bar assembly 36 operatively coupled to the screw anchor assembly. The weigh bar assembly 36 is adapted to measure the anchoring force applied to the bagging machine 10 by the screw anchor assembly 32 engaged in the packed material 28. The anchoring force can be correlated to an estimated packing density based on one or more factors, such as the configuration of the screw anchor assembly, the configuration of the material-forming enclosure 26, and the characteristics of the material being packed. Additional discussion of the weigh bar assembly 36 and its operation will be described herein.

Figure 2:
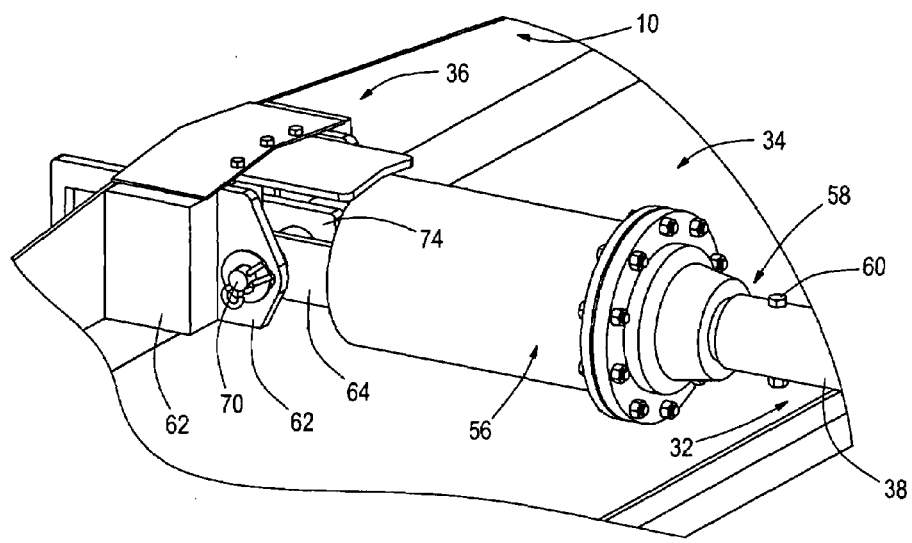
FIG. 2 is a perspective view of a coupling between a screw anchor assembly and a bagging machine.

As discussed above and shown in FIG. 2, the density control apparatus 30 includes a screw anchor assembly 32, a variable speed motor 34, and a weigh bar assembly 36. The screw anchor assembly, the variable speed motor, and the weigh bar assembly may be coupled together in a variety of suitable manners. FIG. 2 illustrates the screw anchor assembly coupled to the variable speed motor and the variable speed motor coupled to the weigh bar assembly. The order of the weigh bar assembly and the variable speed motor may be switched in some configurations. The couplings between the various members of the density control assembly 30 may be direct couplings or indirect couplings including intermediate parts or components.

FIG. 2 illustrates the forward end of the elongate shaft 38 of the screw anchor assembly selectively and releasably coupled to the variable speed motor 34. The variable speed motor 34 includes a gear box 56, such as a planetary gear box, disposed within a housing and coupled to a rotor 58. The gear box 56 is adapted to apply a rotational force to the rotor 58 to cause it to rotate relative to the gear box. As shown in FIG. 2, the elongate shaft 38 is coupled to the rotor 58 via one or more bolts 60 or other coupling mechanisms. The use of bolts 60 enables the screw anchor assembly 32 to be selectively and releasably coupled to the variable speed motor 34. The coupling between the screw anchor assembly 32 and the rotor 58 of the motor is adapted to enable the rotational force of the motor on the rotor to be transferred to the screw anchor assembly 32. Accordingly, the variable speed motor may be adapted to rotate screw anchor assembly. The variable speed motor 34 may be configured in any suitable manner capable of rotating the screw anchor assembly 32, including the use of a gear box 56 and a rotor 58 as shown in FIG. 2.

The variable speed motor may be adapted to rotate the screw anchor assembly at a variety of speeds. When the motor is engaged and rotating the screw anchor assembly, the motor may be controllable to provide a screw anchor assembly rotational speed between about 0 rpm and about 5 rpm. Such a range would enable the operator to keep the variable speed motor operating while not rotating the screw anchor assembly, such as may be desirable when the operator is waiting for the next load of material to be packed. Additionally, a variable speed motor with such an operational range may be suitable for bagging operations with a number of different materials, bag configurations, and screw anchor assembly configurations. In some configurations, the variable speed motor may be adapted to provide a rotational speed between about 2 revolutions per minute and about 4 revolutions per minute.

The variable speed motor 34 may further be adapted to rotate in the reverse direction at similar speeds. In configurations where the motor is capable of being on without rotating the screw anchor assembly, the motor may be capable of gradually adjusting the rotational rate from rotating in a first direction to rotating in a reverse direction. Additionally or alternatively, the operator may be required to engage a clutch-mechanism and/or to turn off the variable speed motor before the rotational direction can be reversed.

FIG. 2 further illustrates an exemplary coupling between the variable speed motor 34 and the weigh bar assembly 36. Any suitable coupling that enables the anchoring forces of the screw anchor assembly 32 to be communicated to the weigh bar assembly 36 may be implemented, including selective coupling, releasable coupling, or substantially fixed coupling. The coupling of the motor 34 to the weigh bar assembly will be discussed further in connection with FIGS. 4 and 5 where the density control assembly 30 is illustrated separate from the bagging machine 10 and the coupling is not obscured by the density control apparatus support structures 62. FIG. 2 further illustrates that the density control apparatus 30 may be operatively coupled to the bagging machine 10 in any suitable manner, such as selective coupling, releasable coupling, and/or substantially fixed coupling. As illustrated, the variable speed motor 34 of the density control apparatus 30 is coupled to the support structures 62. As will be seen in later figures, the coupling between the motor 34 and the support structures 62 is a loose coupling adapted to not disturb the measurements of the weigh bar assembly 36.

Figure 3:
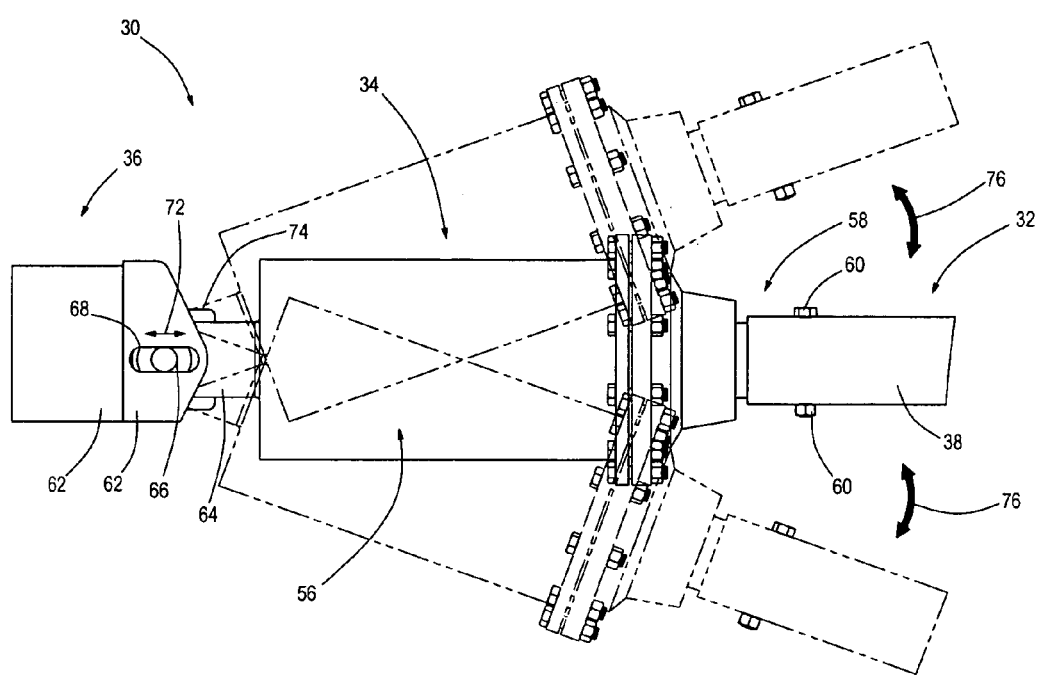
FIG. 3 is a partial side view of a density control apparatus including a screw anchor assembly.

FIG. 3 illustrates additional details of the coupling between the various components of the density control assembly 30 and between the density control assembly and the bagging machine. Similar to FIGS. 1 and 2, FIG. 3 illustrates the screw anchor assembly 32 coupled to a variable speed motor 34, which is in turn coupled to a weigh bar assembly 36. As discussed above, the variable speed motor 34 is also loosely coupled to support structures 62, which are part of or coupled to the bagging machine. Specifically, the variable speed motor includes at least one mounting leg 64 including a coupling hole 66 that is disposed adjacent the support structures 62. As illustrated, support structures 62 include at least one slot 68 that is adapted to cooperate with the coupling hole. A pin, bolt, bracket, or other coupling member (shown as 70 in FIG. 2) may be extended through the slot 68 and through the coupling hole 66. Coupling the variable speed motor 34 to the support structures 62 may prevent the screw anchor assembly from being unintentionally detached from the bagging machine and left in the packed bag. The motor assembly 34 is loosely coupled to the support structures because of the slot 68 in the support structures. Specifically, the variable speed motor 34 is allowed to move forward and rearward with respect to the support structures within a predetermined range, as indicated by the arrow 72. The loose coupling of the variable speed motor 34 to the support structures may provide the back-up security described above without undesirably interfering with the anchoring force measurement by the weigh bar assembly. FIG. 3 further illustrates a portion of a link member 74 of the weigh bar assembly 36, which will be discussed in more detail with respect to FIGS. 4 and 5.

Additionally or alternatively, the loose coupling between the variable speed motor 34 and the support structures 62 of the bagging machine 10 may enable variations in the orientation of the screw anchor assembly 32, as shown in FIG. 3 by arrows 76 and the dashed line representations of the screw anchor assembly and variable speed motor. For example, the coupling member may allow rotation about an axis provided by the coupling member. Additionally or alternatively, the coupling member may provide a pivot point and a loose fit to enable the screw anchor assembly to rotate as necessary during bagging operations. While it may be generally preferred to have the screw anchor assembly 32 extending rearward in a substantially horizontal manner, the forces on the screw anchor assembly during the bagging operations may apply downward and/or upward forces on the screw anchor assembly. By providing the loose fit and the ability of the screw anchor assembly to raise and lower relative to the point of coupling to the bagging machine, the stresses on the coupling components may be reduced and the life of the product extended.

Figure 4:
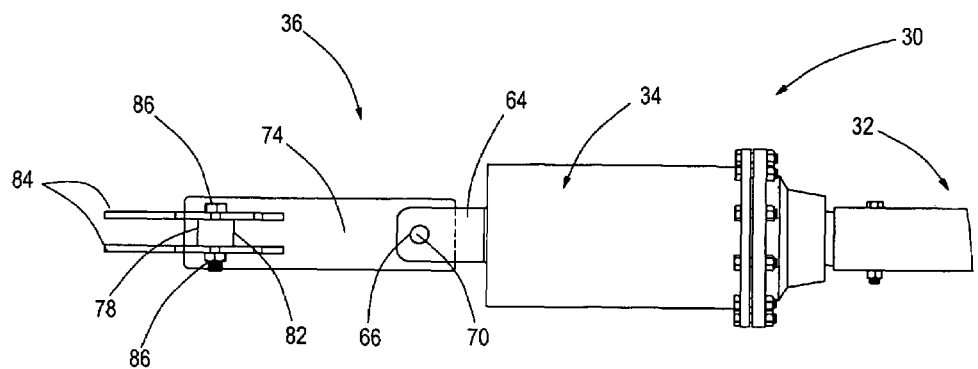
FIG. 4 is a partial side view of a density control apparatus including a screw anchor assembly and a weigh bar assembly.
Figure 5:
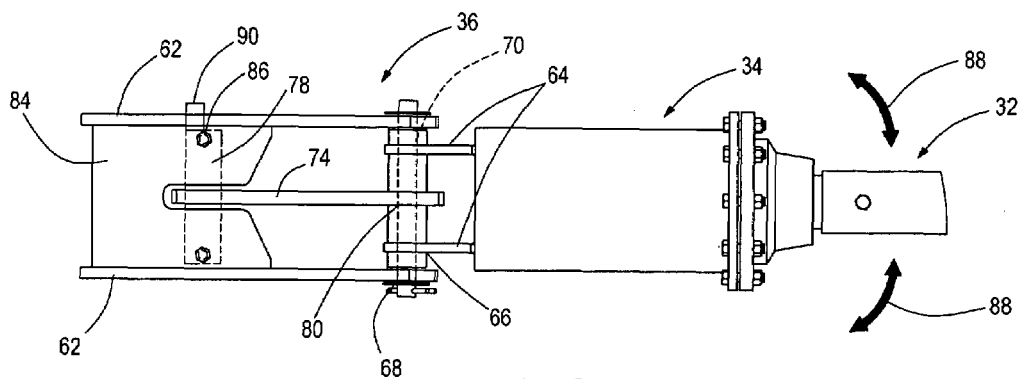
FIG. 5 is a partial top view of a density control assembly including a screw anchor assembly.

Turning now to FIG. 4, a side view of a density control assembly 30 is illustrated separate from the support structures and other components of the bagging machine. FIG. 4 illustrates one exemplary configuration of a weigh bar assembly 36 adapted to transfer the anchoring forces on the screw anchor assembly 32 and variable speed motor 34 to a weigh bar 78 capable of measuring those anchoring forces. While FIG. 4 illustrates one suitable configuration of the density control assembly 30, other combinations of components, whether part of a weigh bar assembly or otherwise, may be suitable for transferring the anchoring forces on the screw anchor assembly to a weigh bar or other suitable force measuring instrument. FIG. 5 illustrates a top view of the exemplary density control apparatus 30 shown in FIG. 4; FIG. 5 also illustrates the association and coupling between the density control apparatus 30 and the support members 62. Similar to FIG. 4, FIG. 5 illustrates one exemplary configuration of density control apparatus 30 while other configurations may be suitable.

With continuing reference to FIGS. 4 and 5, the various components of an exemplary density control apparatus 30 and their interrelationship is illustrated. Variable speed motor 34 is coupled to the link member 74 via the one or more mounting legs 64 of the motor. Link member 74 may include a coupling hole 80 therethrough. As illustrated, the coupling hole 80 of the link member, the coupling hole 66 of the motor mounting legs, and the slot 68 in the support structure are substantially aligned to allow coupling member 70 to pass therethrough to couple the parts together. While a single coupling member 70 is illustrated, multiple coupling members may be suitable as well. For example, the link member 74 and the mounting legs 64 may be coupled together via a first coupling member through aligned holes and the mounting legs 64 may be further coupled to the support structures 62 through one or more additional coupling members, which may be aligned with the first coupling member or off-set therefrom. In one exemplary variation, the mounting legs may include coupling rods integrally projecting from one or more of the sides to enable coupling of the mounting legs to the link member 74 and/or the support structures 62. While the coupling member 70 is illustrated as an elongate rod extending through holes and slots, other suitable structures for coupling the components may be used.

In the illustrated embodiment, the coupling of the mounting legs 64 to the link member 74 provides a tighter coupling than the coupling between the mounting legs and the support structures. As discussed above, the loose coupling between the mounting legs and the support structures includes a slot that allows horizontal movement of the mounting legs relative to the support structures, thereby limiting or reducing the ability of the support structure to interfere with the measurement of the anchoring force. The tighter coupling to the link member 74 provides for suitable communication of the anchoring forces from the screw anchor assembly to the variable speed motor and to the link member. While specific coupling relationships are illustrated in FIGS. 4 and 5, other suitable relationships between the components and coupling members may be implemented to couple the various components of the density control apparatus together while accomplishing the objectives of the present disclosure.

Link member 74 may be configured in any suitable manner to transfer the anchoring forces to the weigh bar 78. In the exemplary configuration shown in FIGS. 4 and 5, link member 74 includes an elongate plate extending forward from adjacent the variable speed motor to the weigh bar 78. Link member 74 includes a weigh bar port 82 adapted to receive a weigh bar 78. The weigh bar port 82 may be a hole through the link member 74 or another suitable method of coupling the link member to the weigh bar 78 to communicate the anchoring forces to the weigh bar. Link member 74 may be sized and/or configured in any suitable manner to accommodate the space requirements of the bagging machine and the density control apparatus. Moreover, in some configurations of the density control apparatus within the scope of the present disclosure, the link member 74 may be effectively omitted by coupling the variable speed motor directly to the weigh bar 78.

Continuing with the exemplary configuration shown in FIGS. 4 and 5, weigh bar 78 is illustrated as extending horizontally and transversally within the bagging machine between the support structures 62. In some configurations, the weigh bar 78 may extend through the support structures or may be disposed within the space defined by the support structures. In other configurations, the weigh bar 78 may be disposed vertically, such as when the link member is disposed in an alternative configuration. The orientation, position, size, and other configuration details of the weigh bar 78 may be modified to cooperate with the other components of the density control apparatus 30 to be able to measure the anchoring forces applied to the screw anchor assembly.

As illustrated in FIGS. 4 and 5, the weigh bar assembly 36 includes weigh bar plates 84 disposed above and below the weigh bar 78. The weigh bar plates 84 are fixedly coupled to the support structures or other component of the bagging machine that is adapted to move forward with the mobile frame. The weigh bar plates 84 provide an upper and a lower support to which the weigh bar 78 may be coupled. As illustrated, one or more bolts 86 extend through the weigh bar support plate 84 and the weigh bar 78 to suitably couple one or more ends of the weigh bar to the forward moving components of the mobile frame 12. Other suitable forms of coupling the weigh bar 78 to the bagging machine may be utilized depending on the configuration of the bagging machine, the density control apparatus, and the weigh bar assembly.

As discussed, the weigh bar 78 is coupled to the support structures 62 or some other component rigidly coupled to the mobile frame. Additionally, the weigh bar is coupled to the link member 74 and the portions of the density control apparatus 30 that are anchored within the packed material. Accordingly, the weigh bar 78 is able to measure the amount of anchoring force applied by the screw anchor assembly 32. In one example, the weigh bar 78 may be adapted to measure the deformation in the weigh bar caused by the opposing forces of the bagging machine trying to move forward and the screw anchor assembly being retained by the packed material. Other suitable weigh bars and/or other instruments capable of measuring the anchoring force applied by the screw anchor assembly engaged in the packed material are also within the scope of the present disclosure.

The weigh bar assembly 36 illustrated in FIGS. 4 and 5 in cooperation with a screw anchor assembly 32 and a variable speed motor 34 are exemplary and representative embodiments of a packing density measurement system. As indicated, the weigh bar 78 may be replaced by other suitable force measurement devices. One suitable configuration may include the use of a hydraulic system. Similarly, the density control apparatus may include anchor assemblies of any suitable configuration, including the one or more of the configurations described in the several patents previously incorporated herein. As one representative variation, the density control apparatus may include at least one cable forming a loop extending rearwardly within the tunnel. The forward regions of the cable loop may be adapted to be drawn together and moved apart to vary the anchoring force applied by the cable. The cable loop engages the packed material and applies an anchoring force to the bagging machine. Suitable link members may be implemented to transfer this anchoring force to a suitable measurement device, such as a weigh bar assembly or a hydraulic system. In another exemplary configuration of an internal density measurement system according to the present disclosure, the density control apparatus may include at least one drag member extending between the ground and the packed material such that the packed material resting on the drag member applies an anchoring force to the bagging machine. Suitable measurement systems may be implemented to measure the amount of anchoring force. Accordingly, in one aspect of the present disclosure, a packing density measurement system includes a suitable anchor assembly, such as a cable loop, a screw assembly, a drag member, etc., and a suitable force measurement assembly, such as a weigh bar assembly, a hydraulic system, etc.

As discussed above, the screw anchor assembly 32 may experience additional forces other than direct forward and rearward forces during the bagging operation. For example and as discussed in connection with FIG. 3, the rearward end of the screw anchor assembly may experience forces causing vertical movement thereof. As shown in FIG. 3, the connection between the screw anchor assembly 32 and the remainder of the bagging machine and the density control apparatus allowed for rotation at or near the forward end of the screw anchor assembly to accommodate these vertical forces at the rearward end of the density control apparatus. Similarly and as shown in FIG. 5, the density control apparatus 30 may be adapted to allow side-to-side movement as indicated by arrows 88. In one exemplary configuration, the side-to-side movement is accommodated by the slots 68 in the support structure 62. The forces on the screw anchor assembly 32 during a bagging operation will be primarily directed along the longitudinal axis of the elongate shaft 38. However, the rotation of the flights in the packed material may introduce additional minor forces in the vertical or lateral direction, which forces would be periodic and cyclical. For example, the rearward end may be moved to the right, then upward, then to the left correcting for the original movement to the right and possibly continuing further to the left, then downward correcting the upward movement and possibly continuing further downward, and then repeating the cycle as the auger continues to rotate. The range of motion will typically be quite small. However, under the magnitude of forces on the density control apparatus 30 and the number of repetitions to which the apparatus may be subjected, a density control apparatus 30 including configurations that allow for such minor movements may reduce wear upon the component parts. While density control apparatus 30 within the scope of the present disclosure may include such configurations to allow for vertical and/or lateral movement of the screw anchor assembly 32, density control apparatus without such adaptations are also within the scope of the present disclosure.

With continuing reference to FIG. 5, weigh bar assembly 36 may include an output member 90. Output member 90 may be operatively associated with the weigh bar 78 to facilitate the measurement of the forces on the weigh bar and to communicate that measurement to an operator. Weigh bar 78 and output member 90 may be associated in any suitable manner, which manner may depend on the configuration of the weigh bar or other instrument used to measure the forces on the bagging machine. As illustrated in FIG. 5, output member 90 communicates at least with one end of the weigh bar 78 and extends through the side support structure 62. The output member 90 could similarly communicate with any other suitable region of the weigh bar 78 and be disposed in a manner suitable to communicate the measured forces to an operator. In some configurations, the output member 90 may include sensors, circuits, converters, or other components or systems suitable to convert the deformation of the weigh bar 78 into a measured force. The measured force may be determined through purely mechanical means producing an analog display, such as a gauge, for the operator. Additionally or alternatively, the weigh bar 78 and output member 90 may include converters and circuits to convert the mechanical measurement of the weigh bar deformation into a digital signal representative of the deformation and/or the forces on the weigh bar. In implementations including alternative force measurement systems, alternative output member configurations and communication systems may be utilized.

Regardless of the configuration of the weigh bar 78 and output member 90, whether configured to produce an analog or digital output, an output display 92 may be disposed in any suitable position on the bagging machine to be read by or communicated to the operator, at least periodically, such as shown in FIG. 1. The position of the output display 92 may vary depending on the configuration of the bagging machine 10, including such components as the mobile frame 12 and the position of the operator's cab 18 or other operator's station. The output display 92 may include a display screen 94 or other means of communicating the measured forces to an operator. As discussed above, the display screen 94 may include digital, electronic, analog, and/or mechanical displays.

The output display 92 may communicate a variety of data to the operator, including data from the density control apparatus 30 and data from other components of the bagging machine 10, such as the material-receiving assembly 22 and the material-packing assembly 24. In some configurations, the output display 92 may communicate the measured deformation of the weigh bar 78. Additionally or alternatively, the density control apparatus and/or the output display may be adapted to correlate the measured deformation to a measurement of force on the weigh bar 78 required to produce the measured deformation. In such configurations, the force may be communicated the operator via the output display 92, alone or together with the deformation measurement. Forces are applied to the weigh bar at least by the screw anchor assembly and by the weigh bar plates to which the weigh bar is coupled. These forces are opposed and may vary during the course of the bagging operation depending on the feed rates, the packing rates, and the operation of the density control apparatus. As used herein, the weigh bar is referred to as measuring the anchoring force applied by the density control apparatus because without the screw anchor assembly applying a rearward force, there would be no deformation. Accordingly, though multiple forces are acting on the weigh bar 78 to cause the deformation, the weigh bar 78 measures the anchoring force.

While the deformation of the weigh bar 92 and the net force on the weigh bar are relevant to the bagging operation, they may not directly communicate the packing density of the packed material to the machine operator. As discussed above, the operator may be principally concerned with maintaining the packing density of the packed materials within a predetermined range. A density control apparatus 30 according to the present disclosure may be adapted to communicate the packing density to the operator through automated or manual correlation of the measured anchoring force to a correlated packing density. Depending on the diversity of bagging operations a machine is intended to perform, the correlation may be the same for all bagging operations or may vary between operations. For example, a bagging machine intended to bag similar materials under similar conditions throughout its useful life may be provided with a single correlation table, either displayed adjacent the output display 92 for quick reference by the operator or embedded in the communication between the weigh bar 78 and the output display 92 such that the display includes information communicating the packing density to the operator. Additionally or alternatively, a bagging machine may be provided with more than one correlation table with each correlation table being suitable for one or more sets of bagging conditions. For example, a correlation table for bagging wet alfalfa and a correlation table for bagging dry alfalfa may be disposed adjacent the output display 92 to allow the operator to selectively reference the appropriate table depending on the conditions of the bagging operation. As an additional or alternative example, the output display be allow the user to select, such as through a plurality of push buttons 96, dial settings, or electronic means, the bagging conditions of the present bagging operations to indicate to the density control apparatus and/or output display which correlation table or settings to use in calculating the packing density from the measured weigh bar deformation. While electronics, computers, and similar components may be used to calculate the packing density, density control apparatus 30 may be adapted to simply display the measured weigh bar deformation and allow the operator to correlate the deformation to the packing density based on his experience and intuition.

As discussed, the output display 92 may be disposed in any suitable location on the bagging machine 10, such as in or adjacent the operator's cab 18 or other location from which the operator controls one or more aspects of the bagging machine. Accordingly, an operator of a bagging machine equipped with a density control apparatus according to the present disclosure may be able exert improved control over the packing density of the material in the bag due the additional information about the bagging operation. Specifically, the weigh bar assembly 36 provides the operator with information regarding what is occurring within the packed bag in addition to his ability to monitor conditions outside the bag. The operator may adjust the operation of the density control apparatus 30 in response to the measured weigh bar deformation, the measured anchoring force, and/ or the correlated packing density. For example, the operator may increase or decrease the rate at which loose material is fed to the bagging machine, may alter what is being fed to the bagging machine (such as by changing the moisture content or the particle size of the loose material), and/or may alter the operation of the material-packing assembly 24. Additionally or alternatively, the operator may alter the operation of the variable speed motor to increase or decrease the rotational speed of the screw anchor assembly. Depending on which way the screw anchor assembly is rotating and as one example, increasing the rotational speed may decrease the anchoring force and thereby decrease the packing density. As discussed above, the varied rotational direction and rotational speeds of the screw anchor assembly 32 will impact the packing density differently depending on the orientation of the flight, the pitch, and the other variables in the screw anchor assembly configuration.

The operator may control the operating conditions of one or more of the above described components or other components in any suitable manner. For example, when the bagging machine 10 includes an operator's cab 18, a control panel 98 including one or more controllers 100 may enable control of one or more components of the bagging machine. Additionally or alternatively, one or more controllers may be disposed on the output display apparatus 92. As discussed above, not all bagging machines 10 need to include an operator's cab 18. Accordingly, output display 92, display screen 94, push buttons 96, control panel 98, and/or controllers 100 may be disposed in any suitable location on the bagging machine.

Figure 6:
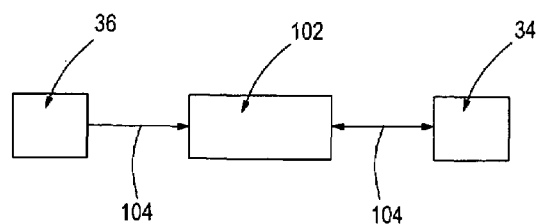
FIG. 6 is a schematic illustration of a communication system between components of a density control assembly including an automation system.

Bagging machines within the scope of the present disclosure may be adapted to provide controllers 100 of a variety of configurations to facilitate the control of the bagging machine, including the control of the density control apparatus 30. For example, levers, wheels, slide bars, foot pedals, or other suitable controllers may be used. Additionally or alternatively, the bagging machines may include one or more automation systems adapted to automatically control one or more components in response to one or more inputs. In one exemplary configuration of an automation system, a rotor control assembly 102 may be operatively coupled to the weigh bar assembly 36 and to the variable speed motor 34. A schematic view of a suitable communication relationship between the weigh bar assembly 36, the variable speed motor 34, and the rotor control assembly 102 is shown in FIG. 6. The rotor control assembly 102 may be adapted to monitor the anchoring force applied to the bagging machine and to enable control of the variable speed motor to vary the rotational speed of the screw anchor assembly.

Continuing with the exemplary rotor control assembly 102, the rotor control assembly may monitor the anchoring force applied to the bagging machine in any suitable manner, such as by receiving an input from the weigh bar assembly output member 90. Additionally or alternatively, the rotor control assembly 102 may interface with the components and circuits of the weigh bar assembly that communicate with the output display 92. The rotor control assembly 102 may monitor the actual anchoring force or may monitor the measured deformation in the weigh bar or the correlated packing density. Regardless of which variable is monitored by the rotor control assembly 102, at least one input that can be correlated to the packing density of the bagging machine is monitored by the rotor control assembly. Additionally, the rotor control assembly 102 receives data input from the variable speed motor 34. The data monitored from the motor 34 may include the power level exerted, the configuration or the gears in the gear box 56, the rotational speed of the rotor 58, or other suitable data that may be correlated to the rotational speed of the screw anchor assembly 32. Additionally, the rotor control assembly 102 may receive operator input from the operator, such as whether to increase or decrease the rotational speed of the rotor 58. The exemplary rotor control assembly 102 may have at least one output as well. The output from the rotor control assembly may be adapted to control the rotational speed of the rotor, and thereby the screw anchor assembly. The rotor control assembly may communicate with the weigh bar assembly 36 and the variable speed motor 34 via any suitable communication interface 104, such as wired or wireless communication.

In some exemplary embodiments, the rotor control assembly 102 may be adapted to automatically control the rotational speed of the screw anchor assembly to maintain the anchoring force within a predetermined range. For example, the operator may be able configure the rotor control assembly 102 to operate in a particular packing mode, such as a corn packing mode, wherein the rotor control assembly is configured to monitor the anchoring force and control the rotational speed of the screw anchor assembly to maintain the anchoring force within a predetermined range appropriate for packing corn. Additionally or alternatively, the rotor control assembly 102 and the output display 92 may cooperate and/or communicate to provide a cruise-control-like functionality to the bagging machine. For example, the output display 92 may inform the operator of the internal conditions within the bag as discussed above. The operator may then determine that a particular condition is preferred, such as a particular measured weigh bar deformation or anchoring force. The operator may input the preferred or target condition to the rotor control assembly 102 via one or more controls. In a preferred embodiment, the input may be as simple as a push button, such as the cruise-control function of a car. The rotor control assembly 102 then sets the target condition as its set-point and monitors and controls conditions to stay within a predetermined range of the target conditions. For example, the operator may input a target anchoring force and the rotor control assembly may vary the rotational speed of the anchor control assembly 32 to maintain the anchoring force near the target anchoring force, which may be within a predetermined range in some configurations.

The rotor control assembly 102 is representative of suitable automation systems that may be incorporated into bagging machines according to the present disclosure. As indicated above, the automation systems may receive inputs from one or more components of the bagging machine and the operator and may provide outputs to control one or more components. Exemplary variations of a suitable automation system include systems that monitor the material feed rate at the material receiving assembly 22 and vary the operation of the material-packing assembly 24 and/or the density control apparatus 30 in response to changes in the material feed rate. Additionally or alternatively, the automation system may include other control assemblies suitable for the configuration of the density control assembly. For example, in the cable loop configuration described above, the automation may include a trolley control assembly adapted to vary the spacing between the forward regions of the cable loop in response to packing density measurements. Similarly, in the drag member configuration described above, the automation system may include a suitable drag-member length controller. Other automation systems are within the scope of the present disclosure.

Figure 7:
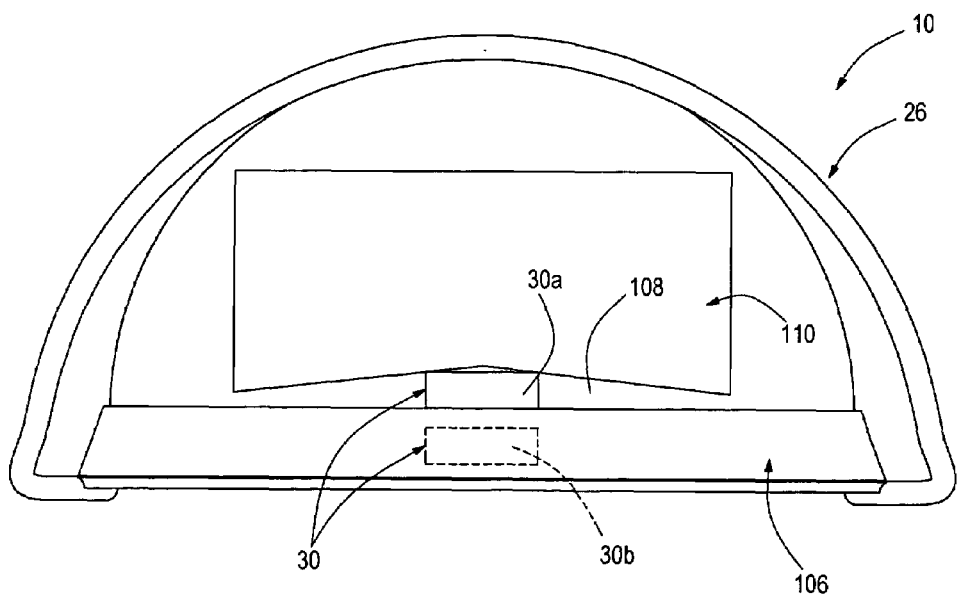
FIG. 7 is a schematic rear view of a bagging machine.

With reference now to FIG. 7, a bagging machine 10 according to the present disclosure is illustrated in a schematic rear view. The schematic view illustrates that the density control apparatus 30 may be disposed in any suitable location within the material-forming enclosure 26. As illustrated in FIGS. 1 and 2 and by schematic representation 30a, the density control apparatus 30 may be disposed on top of the floor assembly 106 and below the top of the beveled press plate 108 or otherwise below the material outlet 110 from the material-packing assembly 24. Similarly, and as illustrated by the schematic representation 30b in dashed lines, the density control apparatus 30 may be disposed below the top of the floor assembly 106 and adapted to extend out from the floor assembly. Other suitable configurations are possible, including configurations where one or more components or portions of the density control assembly 30 extend above the press plate 108 or otherwise into the area of the material outlet 110.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. An adjustable density control apparatus for use with a bagging machine for bagging agricultural, compost, or other loose materials for storage and/or composting into an elongate bag coupled to the bagging machine and extending rearward from a material forming enclosure of the bagging machine to a closed end of the bag, wherein the bagging machine is adapted to move forward as loose material is packed into the bag, the density control apparatus comprising:

a screw anchor assembly adapted to be operatively coupled to the bagging machine, to extend rearwardly within the material forming enclosure, and to engage material packed within the material forming enclosure, wherein the screw anchor engaged in the packed material is adapted to apply an anchoring force to the bagging machine against the forward movement thereof;

a weigh bar assembly operatively coupled to the screw anchor assembly and adapted to measure the anchoring force applied to the bagging machine; and a variable speed motor operatively coupled to the screw anchor and including a rotor adapted to selectively rotate the screw anchor assembly to vary the anchoring force applied to the bagging machine.

2. The adjustable density control apparatus of claim 1, wherein the screw anchor assembly has a screw diameter ranging from about 1 foot to about 3 feet.

3. The adjustable density control apparatus of claim 1, wherein the screw anchor assembly has a tapered screw diameter and at least one flight of generally decreasing screw diameter from a rearward end of the flight to a forward end of the flight.

4. The adjustable density control apparatus of claim 1, wherein screw anchor assembly has a pitch between about 1 foot and about 5 feet.

5. The adjustable density control apparatus of claim 1, wherein at least the screw anchor assembly is releasably coupled to the bagging machine.

6. The adjustable density control apparatus of claim 1, wherein the screw anchor assembly includes at least one flight, wherein the at least one flight is adapted to engage the packed material to provide the anchoring force, and wherein rotation of the screw anchor assembly is adapted to unscrew the at least one flight from the packed material.

7. The adjustable density control apparatus of claim 1, wherein the weigh bar assembly is operatively coupled to an output display to communicate the measured anchoring force to an operator.

8. The adjustable density control apparatus of claim 1, wherein the variable speed motor is adapted to enable an operator to maintain the anchoring force in a predetermined anchoring force range.

9. The adjustable density control apparatus of claim 1, wherein the variable speed motor is adapted to selectively rotate the screw anchor at rotational speeds ranging from about 0 rpm to about 5 rpm.

10. An adjustable density control apparatus for use with a bagging machine for bagging agricultural, compost, or other loose materials for storage and/or composting into an elongate bag coupled to the bagging machine and extending rearward from a material forming enclosure of the bagging machine to a closed end of the bag, wherein the bagging machine is adapted to move forward as loose material is packed into the bag, the density control apparatus comprising:

a screw anchor assembly adapted to be operatively coupled to the bagging machine, to extend rearwardly within the material forming enclosure, and to engage material packed within the material forming enclosure, wherein the screw anchor assembly engaged in the packed material is adapted to apply an anchoring force to the bagging machine against the forward movement thereof;

a weigh bar assembly operatively coupled to the screw anchor assembly and adapted to measure the anchoring force applied to the bagging machine;

a variable speed motor operatively coupled to the screw anchor assembly and including a rotor adapted to rotate the screw anchor assembly at a variable rotational speed to vary the anchoring force applied to the bagging machine; and a rotor control assembly operatively coupled to the weigh bar and to the variable speed motor adapted to monitor the anchoring force applied to the bagging machine and to enable control of the motor to vary the screw anchor assembly rotational speed to obtain a desired anchoring force during bagging operations.

11. The adjustable density control apparatus of claim 10, wherein the rotor control assembly is adapted to monitor the anchoring force applied to the bagging machine and to adjust the rotational speed of the screw anchor to maintain the anchoring force within a predetermined range.

12. The adjustable density control apparatus of claim 10, wherein the weigh bar assembly is operatively coupled to a display apparatus to communicate the measured anchoring force to an operator, wherein the rotor control assembly includes a user interface adapted to enable the operator to establish a target anchoring force; and wherein the rotor control assembly is adapted to monitor the anchoring force applied to the bagging machine and to adjust the screw anchor assembly rotational speed to maintain the anchoring force within a predetermined range of the target anchoring force.

13. The adjustable density control apparatus of claim 10, wherein the variable speed motor is adapted to selectively rotate the screw anchor at rotational speeds ranging from about 0 rpm to about 5 rpm.

14. A bagging machine for bagging agricultural, compost, or other materials into an elongate bag for storage and/or composting, the elongate bag having an open end and a closed end, the bagging machine comprising:

a mobile frame having a forward end and a rearward end;

a material forming enclosure operatively coupled to the mobile frame adjacent the rearward end thereof and extending rearwardly therefrom, wherein the material forming enclosure is adapted to receive the open end of the elongate bag;

a rotary packing apparatus adapted to move loose material into the material forming enclosure and into the elongate bag; wherein the bagging machine is adapted to move forward as the loose material is packed into the bag against the closed end thereof;

a hopper adapted to receive loose material and direct the loose material to the rotary packing apparatus;

a screw anchor assembly adapted to be operatively coupled to the bagging machine, to extend rearwardly within the material forming enclosure, and to engage material packed within the material forming enclosure, wherein the screw anchor assembly engaged in the packed material is adapted to apply an anchoring force to the bagging machine against the forward movement thereof;

a weigh bar assembly operatively coupled to the screw anchor assembly and adapted to measure the anchoring force applied to the bagging machine; and a variable speed motor operatively coupled to the screw anchor assembly and including a rotor adapted to selectively rotate the screw anchor assembly to selectively vary the anchoring force applied to the bagging machine.

15. The bagging machine of claim 14, further comprising a rotor control assembly operatively coupled to the weigh bar assembly and to the variable speed motor and adapted to monitor the anchoring force applied to the bagging machine and to enable control of the motor to vary the screw anchor assembly rotational speed to obtain a desired anchoring force during bagging operations.

16. The adjustable density control apparatus of claim 15, wherein the rotor control assembly is adapted to monitor the anchoring force applied to the bagging machine and to adjust the rotational speed of the screw anchor assembly to maintain the anchoring force within a predetermined range.

17. The adjustable density control apparatus of claim 15, wherein the weigh bar assembly is operatively coupled to a display apparatus to communicate the measured anchoring force to an operator, wherein the rotor control assembly includes a user interface adapted to enable the operator to establish a target anchoring force; and wherein the rotor control assembly is adapted to monitor the anchoring force applied to the bagging machine and to adjust the screw anchor assembly rotational speed to maintain the anchoring force within a predetermined range of the target anchoring force.

18. A method of controlling the packing density of agricultural, compost, or other loose materials being packed into an elongate bag for storage and/or composting, wherein the material is packed by a bagging machine coupled to an elongate bag extending rearwardly from a material forming enclosure of the bagging machine to a closed end of the bag, wherein the bagging machine is adapted to move forward as loose material is packed into the bag, the density control method comprising:
 operatively coupling a screw anchor assembly to the bagging machine, wherein the screw anchor assembly includes a screw anchor that extends rearwardly within the material forming enclosure, and wherein the screw anchor is adapted to engage material packed within the material forming enclosure;
 operating the bagging machine to pack loose material into the material forming enclosure and into the elongate bag;
 applying an anchoring force to the bagging machine against the forward movement thereof by the engagement of the screw anchor in the packed material;
 measuring the anchoring force applied to the bagging machine by the screw anchor engaged in the packed material;
 determining a target anchoring force; and
 selectively rotating the screw anchor to maintain the measured anchoring force within a predetermined range of the target anchoring force.

19. The method of claim 18, further comprising correlating the measured anchoring force to an effective packing density.

20. The method of claim 19, wherein the effective packing density correlated to the measured anchoring force is dependent upon at least the type of material being packed.

* * * * *